United States Patent
Flynn (10) Patent No.: US 6,256,775 B1
(45) Date of Patent: *Jul. 3, 2001

(54) FACILITIES FOR DETAILED SOFTWARE PERFORMANCE ANALYSIS IN A MULTITHREADED PROCESSOR

(75) Inventor: William Thomas Flynn, Rochester, MN (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,220

(22) Filed: Dec. 11, 1997

(51) Int. Cl.⁷ ...................................................... G06F 9/445
(52) U.S. Cl. .................................. 717/4; 717/5; 717/11; 709/107; 709/108
(58) Field of Search ..................................... 395/704, 705; 717/4, 11, 5; 709/108, 107

(56) References Cited

U.S. PATENT DOCUMENTS

| | | |
|---|---|---|
| 5,079,725 | 1/1992 | Geer et al. . |
| 5,148,536 | 9/1992 | Witek et al. . |
| 5,179,702 | 1/1993 | Spix et al. . |
| 5,197,138 | 3/1993 | Hobbs et al. . |
| 5,212,693 * | 5/1993 | Chao et al. ........................ 371/10.1 |
| 5,287,508 | 2/1994 | Hejna, Jr. et al. . |
| 5,339,415 | 8/1994 | Strout, II et al. . |
| 5,353,418 | 10/1994 | Nikhil et al. . |
| 5,357,617 | 10/1994 | Davis et al. . |
| 5,361,334 | 11/1994 | Cawley . |
| 5,361,337 | 11/1994 | Okin . |
| 5,404,469 | 4/1995 | Chung et al. . |
| 5,430,850 | 7/1995 | Papadopoulos et al. . |
| 5,471,593 | 11/1995 | Branigin . |
| 5,490,272 | 2/1996 | Mathis et al. . |
| 5,499,349 | 3/1996 | Nikhil et al. . |

(List continued on next page.)

FOREIGN PATENT DOCUMENTS 2 234 613   2/1991   (GB) .

OTHER PUBLICATIONS

Hidaka et al., "Multiple Threads in Cyclic Register Windows", ACM, pp. 131–142, May 1993.*

Dongarra, J. J., "A Survey of High Performance Computers", *U.S. Government Work*, pp. 8–11, (Jan. 10, 1986).

(List continued on next page.)

Primary Examiner—Mark R. Powell
Assistant Examiner—Ted T. Vo
(74) Attorney, Agent, or Firm—Merchant & Gould; Roy W. Truelson (57) ABSTRACT

A method, apparatus, and article of manufacture for monitoring performance of an application or a system program executed by a multithreaded processor arranged and configured to process a plurality of threads and facilitate thread switch. The low-level invisible events, such as cache misses, or other events of interest of an application or a system program, are detected and recorded by using a software monitor program running on a thread of the multithreaded processor via thread switching techniques. The monitoring thread gains control once a selected event is detected while executing the application or system program, and it relinquishes the control after completing the recording of the selected event. The recorded information allows one to dynamically profile the application or the system program and to provide insight into the performance characteristics of the application or the system program.

15 Claims, 6 Drawing Sheets

U.S. PATENT DOCUMENTS

| | | |
|---|---|---|
| 5,515,538 | 5/1996 | Kleiman . |
| 5,535,361 | 7/1996 | Hirata et al. . |
| 5,574,939 | 11/1996 | Keckler et al. . |
| 5,613,114 | 3/1997 | Anderson et al. . |
| 5,630,136 | 5/1997 | Davidson et al. . |
| 5,694,603 | 12/1997 | Reiffin . |
| 5,694,604 | 12/1997 | Reiffin . |
| 5,835,705 * | 11/1998 | Larsen et al. .................. 395/184.01 |

OTHER PUBLICATIONS

Eickemeyer, R. J. et al., "Evaluation of Multithreaded Uniprocessors for Commercial Application Environments", *ISCA*, pp. 203–212 (May 1996).

Iannucci, R. A., "Two Fundamental Issues in Multiprocessing", *Laboratory for Computer Science, Massachusetts Institute of Technology, Proceeding of the DFVLR Conference*, pp. 61–88 (Jun. 25–29, 1987).

Kuck, D. J. et al., "The Burroughs Scientific Processor (BSP)", *IEEE Transactions on Computers*, C–31(5):363–376 (May 1982).

Song, P., "Multithreading Comes of Age", *Microdesign Resources*, pp. 13–18 (Jul. 14, 1997).

Thekkath, R. et al., "The Effectiveness of Multiple Hardware Contexts", Department of Computer Science and Engineering, FR–35, University of Washington, pp. 328–337 (1994).

Tomasulo, R. M., "An Efficient Algorithm for Exploiting Multiple Arithmethic Units", *IBM Journal*, pp. 25–33 (Jan. 1967).

Weber W. et al., "Exploring the Benefits of Multiple Hardware Contexts in a Multiprocessor Architecture: Preliminary Results", The 16th Annual International Symposium on Computer Architecture, *IEEE Computer Society Press*, pp. 272–280 (1989).

Willis J. et al., "What is Data–driven, Multithreaded Architecture?" *IBM*, pp. 1–21 (Aug. 24, 1995).

IBM Technical Disclosure Bulletin, 39(8):113–116 (Aug. 1996).

U.S. application No. 08/473,692, filed Jun. 7, 1995.
U.S. application No. 08/675,315, filed Jul. 3, 1996.
U.S. application No. 08/957,002, filed Oct. 23, 1997.
U.S. application No. 08/773,572, filed Dec. 27, 1996.
U.S. application No. 08/761,378, filed Dec. 9, 1996.
U.S. application No. 08/761,380, filed Dec. 9, 1996.
U.S. application No. 08/761,379, filed Dec. 9, 1996.
U.S. application No. 08/958,716, filed Oct. 23, 1997.
U.S. application No. 08/956,875, filed Oct. 23, 1997.
U.S. application No. 08/958,718, filed Oct. 23, 1997.
U.S. application No. 08/956,577, filed Oct. 23, 1997.

* cited by examiner

FACILITIES FOR DETAILED SOFTWARE PERFORMANCE ANALYSIS IN A MULTITHREADED PROCESSOR

RELATED APPLICATION DATA

The present invention generally relates to the following U.S. applications, the subject matter of which is hereby incorporated by reference: (1) U.S. patent application entitled Using Multithreading Resources For Improving Branch Instruction Handling, RO997-172 (unknown serial no., filing date Oct. 29, 1997); (2) U.S. patent application entitled Method and Apparatus to Force a Thread Switch In a Multithreaded Processor, RO997-107 (unknown serial no., filing date Oct. 23, 1997); (3) U.S. patent application entitled Method and Apparatus for Selecting Thread Switch Events in a Multithreaded Processor, RO997-104 (unknown serial no., filing date Oct. 23, 1997); (4) U.S. patent application entitled Forward Progress Guarantee in a Multithreaded Processor, RO997-105 (unknown serial no., filing date Oct. 23, 1997); (5) U.S. patent application entitled Altering Thread Priorities in a Multithreaded Processor, RO997-106 (unknown serial no., filing date Oct. 23, 1997); (6) U.S. patent application entitled Thread Switch Control in a Multithreaded Processor System, RO996-042 (unknown serial no., filing date Oct. 23, 1997); (7) U.S. Ser. No. 08/773,572 filed Dec. 27, 1996 entitled Background Completion of Instruction and Associated Fetch Request in a Multithread Processor; (8) U.S. Ser. No. 08/761,378 filed Dec. 9, 1996 entitled Multi-Entry Fully Associative Transition Cache; (9) U.S. Ser. No. 08/761,380 filed Dec. 9, 1996 entitled Method and Apparatus for Prioritizing and Routing Commands from a Command Source to a Command Sink; (10) U.S. Ser. No. 08/761,379 filed Dec. 9, 1996 entitled Method and Apparatus for Tracking Processing of a Command; and (11) U.S. Ser. No. 08/473,692 filed Jun. 7, 1995 entitled Method and System for Enhanced Multithread Operation in a Data Processing System by Reducing Memory Access Latency Delays.

FIELD OF THE INVENTION

The present invention relates in general to an improved method for and apparatus of a computer data processing system, and in particular, to an improved high performance processor and method embodied in the combination of hardware and software of the processor by using thread-switch techniques to monitor low-level events throughout a chip without external monitoring devices.

BACKGROUND OF THE INVENTION

The fundamental structure of a modern computer includes peripheral devices to communicate information to and from the outside world; such peripheral devices may be keyboards, monitors, tape drives, communication lines coupled to a network, etc. Also included in the basic structure of the computer is the hardware necessary to receive, process, and deliver this information to and from the outside world, including busses, memory units, input/output (I/O) controllers, storage devices, and at least one central processing unit (CPU), etc. By analogy, the CPU is the brain of the system since it executes the instructions which comprise a computer program and directs the operation of the other system components.

From the standpoint of the computer's hardware, most systems operate in fundamentally the same manner. Processors actually perform very simple operations quickly, such as arithmetic, logical comparisons, and movement of data from one location to another. Programs which direct a computer to perform massive numbers of these simple operations may offer the illusion that the computer is doing something sophisticated. What is perceived by the user as a new or improved capability of a computer system, however, may actually be the machine performing the same simple operations, but much faster. Therefore continuing improvements to computer systems require that these systems be made ever faster.

One measurement of the overall speed of a computer system, also called the throughput, is measured as the number of operations performed per unit of time. Conceptually, the simplest of all possible improvements to system speed is to increase the clock speeds of the various components, particularly the clock speed of the processor. For example, if everything runs twice as fast but otherwise works in exactly the same manner, the system should generally perform a given task in half the time. Computer processors which were constructed from discrete components years ago performed significantly faster by shrinking the size and reducing the number of components; eventually the entire processor was packaged as an integrated circuit on a single chip. The reduced size made it possible to increase the clock speed of the processor, and accordingly increase system speed.

Despite the enormous improvement in speed obtained from integrated circuitry, the demand for ever faster computer systems still exists. Hardware designers have been able to obtain still further improvements in speed by greater integration, by further reducing the size of the circuits, and by other techniques. However, physical size reductions cannot continue indefinitely and there are limits to continually increasing processor clock speeds. Attention has therefore been directed to other approaches for further improvements in overall speed of the computer system.

Without changing the clock speed, it is still possible to improve system speed by using multiple processors. The modest cost of individual processors packaged on integrated circuit chips has made this practical. The use of slave processors considerably improves system speed by off-loading work from the CPU to the slave processor. For instance, slave processors routinely execute repetitive and single special purpose programs, such as input/output device communications and control. It is also possible for multiple CPUs to be placed in a single computer system, typically a host-based system which services multiple users simultaneously. Each of the different CPUs can separately execute a different task on behalf of a different user, thus increasing the overall speed of the system to execute multiple tasks simultaneously. It is much more difficult, however, to improve the speed at which a single task, such as an application program, executes. Coordinating the execution and delivery of results of various functions among multiple CPUs is a challenging task. For slave I/O processors this is not as difficult because the functions are pre-defined and limited, but for multiple CPUs executing general purpose application programs it is much more difficult to coordinate functions because, in part, system designers do not know the details of the programs in advance. Most application programs follow a single path or flow of steps performed by the processor. While it is sometimes possible to break up this single path into multiple parallel paths, a universal application for doing so is still being researched. Generally, breaking a lengthy task into smaller tasks for parallel processing by multiple processors is done by a software engineer writing code on a case-by-case basis. This ad hoc approach is especially problematic for executing commercial programs which are not necessarily repetitive or predictable.

Thus, while multiple processors improve overall system performance, there are still many reasons to improve the speed of the individual CPU. If the CPU clock speed is given, it is possible to further increase the speed of the CPU, i.e., the number of operations executed per second, by increasing the average number of operations executed per clock cycle. A common architecture for high performance, single-chip microprocessors is the reduced instruction set computer (RISC) architecture characterized by a small simplified set of frequently used instructions for rapid execution, those simple operations performed quickly mentioned earlier. As semiconductor technology has advanced, the goal of RISC architecture has been to develop processors capable of executing one or more instructions on each clock cycle of the machine.

Another approach to increase the average number of operations executed per clock cycle is to modify the hardware within the CPU. This throughput measure, clock cycles per instruction, is commonly used to characterize architectures for high performance processors. Instruction pipelining and cache memories are computer architectural features that have made this achievement possible. Pipeline instruction execution allows subsequent instructions to begin execution before previously issued instructions have finished. Cache memories store frequently used and other data nearer the processor and allow instruction execution to continue, in most cases, without waiting the full access time of a main memory. Some improvement has also been demonstrated with multiple execution units with look ahead hardware for finding instructions to execute in parallel.

The performance of a conventional RISC processor can be further increased in the superscalar computer and the Very Long Instruction Word (VLIW) computer, both of which execute more than one instruction in parallel per processor cycle. In these architectures, multiple functional or execution units are provided to run multiple pipelines in parallel. In a superscalar architecture, instructions may be completed in-order and out-of-order. In-order completion means no instruction can complete before all instructions dispatched ahead of it have been completed. Out-of-order completion means that an instruction is allowed to complete before all instructions ahead of it have been completed, as long as a predefined rules are satisfied.

For both in-order and out-of-order execution in superscalar systems, pipelines will stall under certain circumstances. An instruction that is dependent upon the results of a previously dispatched instruction that has not yet completed may cause the pipeline to stall. For instance, instructions dependent on a load/store instruction in which the necessary data is not in the cache, i.e., a cache miss, cannot be executed until the data becomes available in the cache. Maintaining the requisite data in the cache necessary for continued execution and to sustain a high hit ratio, i.e., the number of requests for data compared to the number of times the data was readily available in the cache, is not trivial especially for computations involving large data structures. A cache miss can cause the pipelines to stall for several cycles, and the total amount of memory latency will be severe if the data is not available most of the time. Although memory devices used for main memory are becoming faster, the speed gap between such memory chips and high-end processors is becoming increasingly larger. Accordingly, a significant amount of execution time in current high-end processor designs is spent waiting for resolution of cache misses and these memory access delays use an increasing proportion of processor execution time.

And yet another technique to improve the efficiency of hardware within the CPU is to divide a processing task into independently executable sequences of instructions called threads. This technique is related to breaking a larger task into smaller tasks for independent execution by different processors except here the threads are to be executed by the same processor. When a CPU then, for any of a number of reasons, cannot continue the processing or execution of one of these threads, the CPU switches to and executes another thread. One technique is to incorporate hardware multithreading to tolerate memory latency. The term "multithreading" as defined in the computer architecture community is not the same as the software use of the term which means one task subdivided into multiple related threads. In the architecture definition, the threads may be independent. Therefore, the term "hardware multithreading" is often used to distinguish the two uses of the term "multithreading". The present invention incorporates the term multithreading to connote hardware multithreading.

Multithreading permits the processors' pipeline(s) to do useful work on different threads when a pipeline stall condition is detected for the current thread. Multithreading also permits processors implementing non-pipeline architectures to do useful work for a separate thread when a stall condition is detected for a current thread. There are two basic forms of multithreading. A traditional form is to keep N threads, or states, in the processor and interleave the threads on a cycle-by-cycle basis. This eliminates all pipeline dependencies because instructions in a single thread are separated. The other form of multithreading is to interleave the threads on some long-latency event.

Traditional forms of multithreading involves replicating the processor registers for each thread. For instance, for a processor implementing the architecture sold under the trade name PowerPC™ to perform multithreading, the processor must maintain N states to run N threads. Accordingly, the following are replicated N times: general purpose registers, floating point registers, condition registers, floating point status and control register, count register, link register, exception register, save/restore registers, and special purpose registers. Additionally, the special buffers, such as a segment lookaside buffer, can be replicated or each entry can be tagged with the thread number and, if not, must be flushed on every thread switch. Also, some branch prediction mechanisms, e.g., the correlation register and the return stack, should also be replicated. Fortunately, there is no need to replicate some of the larger functions of the processor such as: level one instruction cache (L1 I-cache), level one data cache (L1 D-cache), instruction buffer, store queue, instruction dispatcher, functional or execution units, pipelines, translation lookaside buffer (TLB), and branch history table. When one thread encounters a delay, the processor rapidly switches to another thread. The execution of this thread overlaps with the memory delay on the first thread.

Existing multithreading techniques describe switching threads on a cache miss or a memory reference. A primary example of this technique may be reviewed in "Sparcle: An Evolutionary Design for Large-Scale Multiprocessors," by Agarwal et al., IEEE Micro Volume 13, No. 3, pp. 48–60, June 1993. As applied in a RISC architecture, multiple register sets normally utilized to support function calls are modified to maintain multiple threads. For example, eight overlapping register windows are modified to become four non-overlapping register sets, wherein each register set is a reserve for trap and message handling. This system discloses a thread switch which occurs on each first level cache miss that results in a remote memory request. While this system represents an advance in the art, modern processor designs often utilize a multiple level cache or high speed memory which is attached to the processor. The processor system then utilizes some well-known algorithm to decide what portion of its main memory store will be loaded within each level of cache. Therefore, each time a memory reference occurs which is not present within the first level of cache, the processor must attempt to obtain that memory reference from a second or higher level of cache.

It is often desirable to dynamically profile an application or system program so as to provide insight into its performance characteristics, such as the normally invisible low-level events throughout the chip, such as L1 and L2 cache misses, etc. Various methods including software methods and hardware methods exist to monitor performance of an application or a system program. Software methods offer flexibility and user convenience but usually cannot acquire the necessary details of the performance of the application or system program. Hardware methods require connection of external devices to a processor to monitor buses, etc., which are not convenient and also very costly. Current various methods and systems merely provide frequency of occurrence of the low-level events by counting the occurrence. These methods do not provide information as to what kind of event it is, where it is, or when it is, etc. There are other information of an application or a system program that is of interest in profiling the application and the system program. Traditional methods do not provide a monitoring program to detect or record the information of interest so as to improve the performance of the application or a system program.

It should thus be apparent that a need exists for a method, an apparatus, and an article of manufacture to monitor performance of an application or a system program. Thread-switch techniques are used in the present invention to monitor selectable low-level events throughout hardware of a chip.

SUMMARY OF THE INVENTION

The present invention relates in general to an improved method for and apparatus of a computer data processing system, and in particular, to an improved high performance processor and method embodied in the combination of hardware and software of the processor by using thread-switch techniques to monitor low-level events throughout a chip without external monitoring devices.

In accordance with the principles of the present invention, a multithreaded processor, arranged and configured to process a plurality of threads and facilitate thread switch, contains a thread switch control logic to monitor low-level events throughout a computer chip, as a means to assist in deciding when to switch control from an active thread to a dormant thread. The multithreaded processor of the present invention detects the low-level events, such as L1 and L2 cache misses, which are not normally detectable at the software level. By adding some hardware features, the thread switch control logic can be used as a means of detecting, counting, monitoring, etc., selectable events of interest. A thread which interacts with these hardware facilities is used as a monitor program. This thread is thus called "monitor thread". One or more other threads are the processes of an application or a system program being monitored. A dual-threaded processor is the simplest case, where the process being monitored and the monitor itself (or called a software monitor program) are the two threads being executed. In other embodiments, more than one monitor threads can be used to monitor one or more processes of one or more applications or system programs.

Therefore, according to one aspect of the invention, there is provided a multithreaded processor, arranged and configured to process a plurality of threads and facilitate thread switch, for monitoring performance of at least one application running on the processor. The multithreaded processor includes a first thread arranged and configured for executing at least one application on the first thread, a second thread arranged and configured for executing recording of at least one selectable event upon detection of the selectable event during execution the program on the first thread, and a thread switch controller for detecting the selectable event and controlling thread switch between the first thread and the second thread. Upon occurrence of the selectable event, the thread switch controller switches processing from the first thread to the second thread, whereby the second thread records information of the selectable event. Upon completion of recording, the thread switch controller switches processing from the second thread to the first thread. If desired, the first thread can continue executing the application or system program.

One aspect of the invention is the thread switch controller. In one embodiment, the thread switch controller includes a thread switch control register having a first bit for forcing a thread switch, a second bit for indicating whether the thread switch has occurred, a third bit for blocking threadswitch, a fourth bit for allowing exactly two thread switches to occur, and a set of bits for encoding a latest thread switch reason.

Another aspect of the invention is that the first thread is normally an active thread and the second thread is normally a dormant thread prior to occurrence of the selectable event or after completion of recording of the selectable event.

According to a further aspect of the invention, the thread switch control register is an architected software-accessible special purpose register in which the second bit, the third bit, and the set of bits are set by hardware operatively connecting to the processor. The first, second, third, and fourth bits and the set of bits are set and/or reset by a software monitor program operatively implemented in the processor.

Yet another aspect of the invention, the selectable event includes one from the group, but not limited to, of: L1 data cache miss, L2 data cache miss, L1 instruction cache miss, L2 instruction cache miss, instruction translation lookaside buffer (TLB) miss, data translation lookaside buffer (TLB) miss, and thread time-out.

In an alternative embodiment, the software monitor program can be executed on a plurality of threads.

The present invention is also a method of monitoring a selectable event of at least one application by a multi-threaded processor arranged and configured to process a plurality of threads and facilitate thread switch. The method includes the steps of executing at least one application on a first thread of the multithreaded processor, detecting the selectable event of the application by a thread switch controller, switching processing from the first thread to a second thread to record the selectable event and information of the selectable event including a thread switch reason, and switching processing from the second thread to the first thread, upon completion of recording, if desired to continue execution of the application. The multithreaded processor executes processes in a normal mode (i.e. non-monitoring mode) until a monitor program is initialized (monitoring mode). In the monitoring mode, the processor switches between a processing thread and a monitoring thread. The processing thread executes an application or a system program to be monitored, and the monitoring thread executes a monitor program wherein it is active upon detection of at least one selectable event and records the selectable event.

According to a further aspect of the invention, there is provided the method as recited above in which the thread switch controller provides a thread switch control register including a first bit for forcing a thread switch, a second bit for indicating whether the thread switch has occurred, a third bit for blocking threadswitch, a fourth bit for allowing exactly two thread switches to occur, and a set of bits for encoding a latest thread switch reason.

According to another aspect of the invention, there is provided the method as recited above in which the first thread being normally an active thread and the second thread being normally a dormant thread prior to occurrence of the a selectable event or after completion of recording of the selectable event.

According to a further another aspect of the invention, there is provided the method as recited above in which the thread switch control register is an architected software-accessible special purpose register in which the second bit, the third bit, and the set of bits are set by hardware operatively connecting to the processor. The first, second, third, and fourth bits, and the set of bits can be set and/or reset by monitor software operative with respect to the hardware registers.

Another aspect of the method as recited above is that the selectable event includes one from the group, but not limited to, of: L1 data cache miss, L2 data cache miss, L1 instruction cache miss, L2 instruction cache miss, instruction translation lookaside buffer (TLB) miss, data translation lookaside buffer (TLB) miss, and thread time-out.

The invention is also an article of manufacture for a computer-based user-interface. The article of manufacture includes a computer readable medium having instructions for causing a computer to perform a method by a multi-threaded processor arranged and configured to process a plurality of threads and facilitate thread switch, the method comprising the steps of executing the application on a first thread of the multithreaded processor, detecting the selectable event of the application by a thread switch controller, switching processing from the first thread to a second thread to record information of the selectable event, and switching processing from the second thread to the first thread, upon completion of recording, and if desired to continue execution of the application.

One of the advantages is that the present invention provides software with information related to low-level hardware events within a processor. The invention allows software to control characteristics of thread switching which enables an efficient program monitor to be created in a multithreaded processor.

Another advantage is that the present invention has the ability to record a low-level event occurring during execution of a program and specific information related to the low-level event, e.g. what kind of event, where it occurs, and when it occurs, without requiring special hardware.

A further advantage of the present invention relates to the monitor's efficiency or to application's performance. During some of the time the monitor program is running, i.e. on an active thread, the application does not make progress (i.e., the hardware may be servicing a cache miss type of thread switch condition caused by the application or system program). Accordingly, the monitor uses processor cycles which would never have been used by the application or system program. Normally, if the application is running on a non-multithreaded processor, it would be stalled, and the cycles would be lost. This means that some of the processor cycles used by the monitor program to record selectable event(s) are "free" relative to the application or system program—the application or system program notices no performance degradation since it would not have used these processor cycles anyway. Thus, the monitor program does not affect the application's or system program's performance.

Other advantages, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWING

The inventions themselves, however, as well as a preferred mode of use, further objectives and advantages thereof, will be best understood by reference to the following detailed description of an illustrative embodiment when read in conjunction with the accompanying drawings, wherein.

DETAILED DESCRIPTION OF THE ILLUSTRATED EMBODIMENTS

Figure 1:
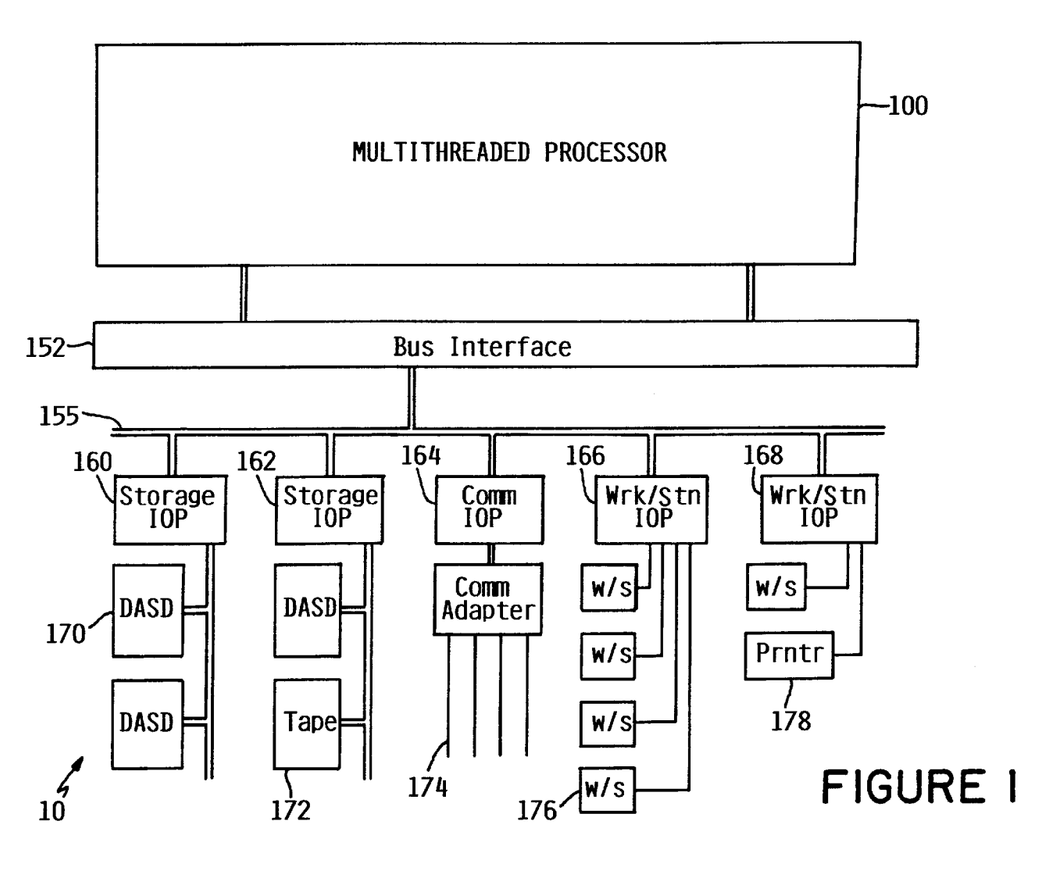
FIG. 1 is a block diagram of a generic computer system capable of implementing the present invention described therein.

With reference now to the figures and in particular with reference to FIG. 1, there is depicted a high level block diagram of a computer data processing system 10 which may be utilized to implement the method and system of the present invention. The primary hardware components and interconnections of a computer data processing system 10 arranged and configured for utilizing the present invention are shown in FIG. 1. Multithreaded processor 100 including a central processing unit (CPU) is arranged and configured to process a plurality of threads and facilitate thread switch. The multithreaded processor 100 communicates via bus interface 152 with system bus 155. Various input/output processors (IOPs) 160–168 attach to the system bus 155 and support communication with a variety of storage and input/output (I/O) devices, such as direct access storage devices (DASD) 170, tape drives 172, remote communication lines 174, workstations 176, and printers 178. It should be understood that FIG. 1 is intended to depict representative components of a computer data processing system at a high level, and that the number and types of such components may vary without departing the scope and spirit of the present invention.

As will be discussed below, the data processing system 10 preferably includes various units, registers, buffers, memories, and other sections which are all preferably formed by integrated circuitry. It should be understood that in the figures, the various data paths have been simplified; in reality, there are many separate and parallel data paths into and out of the various components. In addition, various components not germane to the invention described herein have been omitted, but it is to be understood that processors contain additional units for additional functions. The data processing system 10 can operate according to reduced instruction set computing, RISC, techniques or other computing techniques.

Figure 2:
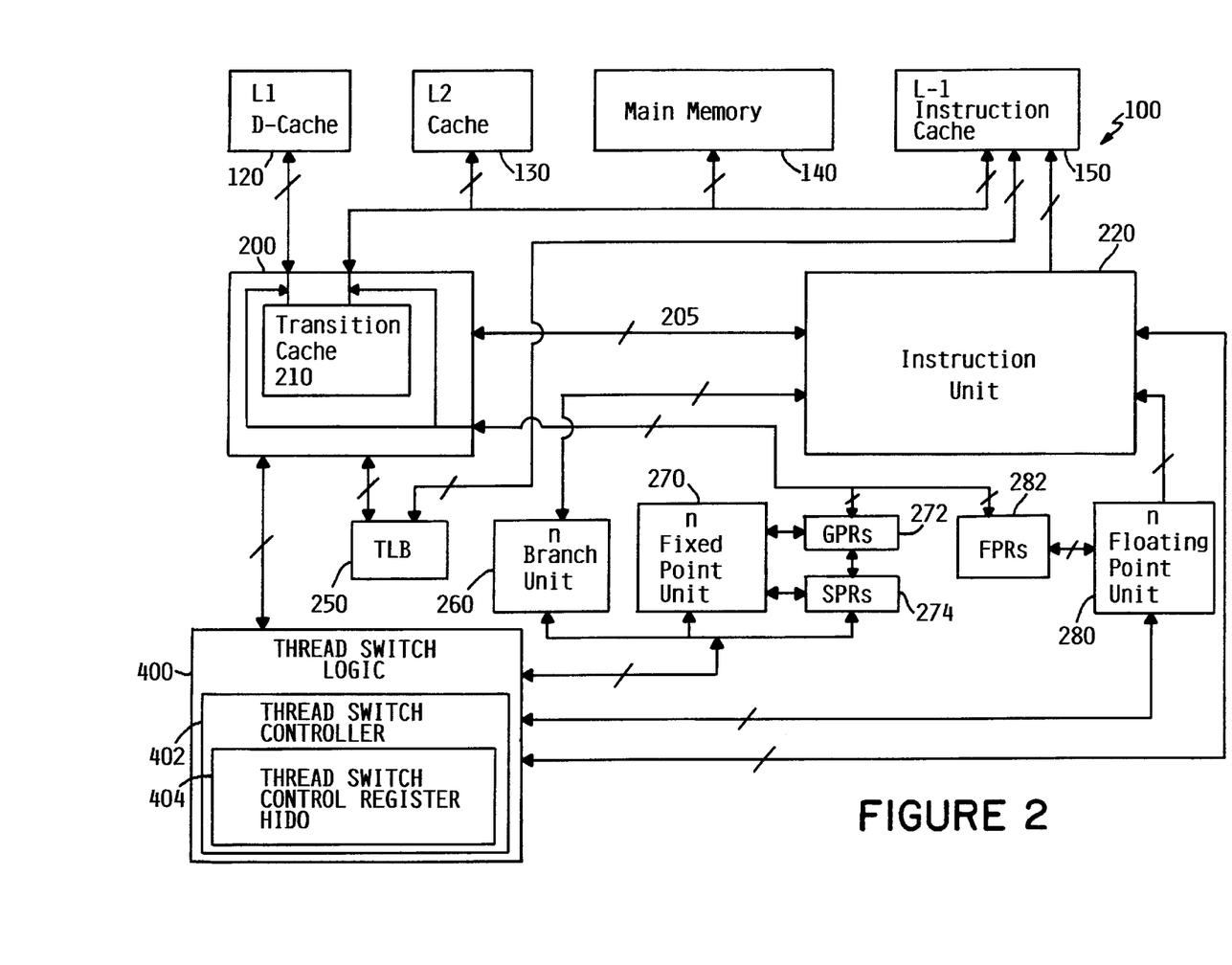
FIG. 2 is a block diagram of a multithreaded data processing system according to the principles of the present invention.

Within the multithreaded processor 100 as shown in FIG. 2, the CPU has a processor core containing specialized functional units, each of which perform primitive operations, such as sequencing instructions, executing operations involving integers, executing operations involving real numbers, transferring values between addressable storage and logical register arrays. FIG. 2 illustrates the processor core of the multithreaded processor 100. In a preferred embodiment, the processor core of the data processing system 10 is a single integrated circuit, pipelined, superscalar microprocessor, which may be implemented utilizing any computer architecture such as the family of Reduced Instruction Set Computer (RISC) processors sold under the trade name PowerPC™; for example, the PowerPC™ 604 microprocessor chip sold by IBM.

In FIG. 2, the multithreaded processor 100 of the data processing system 10 preferably includes a level one data cache, L1 D-cache 120, a level two L2 cache 130, a main memory 140, and a level one instruction cache, L1 I-cache 150, all of which are operationally interconnected utilizing various bus connections and a storage control unit 200. The storage control unit 200 includes a transition cache 210 for interconnecting the L1 D-cache 120 and the L2 cache 130, the main memory 140, and a plurality of execution units. The L1 D-cache 120 and the L2 cache 130 preferably are provided on chip as part of the processor 100 while the main memory 140 and the L2 cache 130 are provided off chip. The memory of the data processing system preferably represents random access main memory which may or may not be within the processor 100, other data buffers and caches, if any, external to the processor 100, and other external memory, for example, DASD 170, tape drives 172, and workstations 176 as shown in FIG. 1. The L2 cache 130 is preferably a higher speed memory system than the main memory 140, and by storing selected data within the L2 cache 130, the memory latency which occurs as a result of a reference to the main memory 140 can be minimized. The storage unit 200 is directly connected to an instruction unit 220.

Instructions from the Level-1 instruction cache 150 are preferably output to the instruction unit 220 which, in accordance with the method and system of the present invention, controls the execution of multiple threads by the various subprocessor units, e.g., branch units 260, fixed point units 270, and floating point unit 280 and others as specified by the architecture of the data processing system 10. In addition to the various execution units depicted within FIG. 1, those skilled in the art will appreciate that modern superscalar microprocessor systems often include multiple versions of each such execution unit which may be added without departing from the spirit and scope of the present invention. Most of these units will have as an input source operand information from various registers such as general purpose registers GPRs 272, and floating point registers FPRs 282. Additionally, multiple special purpose registers SPRs 274 may be utilized in accordance with the method and system of the present invention to store processor state information in response to thread operation including starting a thread, ending a thread, switching threads, etc. As shown in FIG. 2, the Level-1 data cache 120 is coupled to the general purpose registers 272 and the floating point registers 282 via the storage control unit 200. The general purpose registers 272 are connected to the special purpose registers 274. Further, both general purpose registers 272 and special purpose registers 274 are directly coupled to the fixed point units 270, respectively. Further, the branch units 260, the fixed point units 270, and the specific purpose registers SPRs 274 are coupled to each other. The floating point registers FPRs 282 are connected between the floating point units 280 and the Level-1 data cache 120 via the storage control unit 200. Further, a translation lookaside buffer TLB 250 is provided between the L-1 instruction cache 150 and the storage control unit 200. The translation lookaside buffer TLB 250 contains virtual-to-real address mapping.

Among the functional hardware units unique to this multithreaded processor is a thread switch logic unit 400. The thread switch logic unit 400 contains various registers that determine which thread will be the active or running thread and which thread(s) will be dormant thread(s). The thread switch logic unit as shown in FIG. 2 includes a thread switch controller 402 for detecting a selectable event such that upon occurrence and detection of the selectable event, the thread switch controller 402 switches from one thread to the other thread. In one preferred embodiment, one thread is used to run or execute a system program or an application which is to be monitored, and another thread is used to run a monitor program to monitor the occurrence of the selectable event(s), i.e. to record or save the event(s) for analysis of the performance of the application. The first thread is hereinafter called processing thread, and the second thread is hereinafter called monitoring thread. Upon detection of a selected event, the thread switch controller 402 switches from the processing thread to the monitoring thread. After completion of the monitoring event, the thread switch controller 402 switches back from the monitoring thread to the processing thread. It may be desirable to keep the monitoring process short to limit its effect on the computer system, such as processor cycles and resources affected during the monitoring. To shorten the monitoring latency, the monitoring thread may merely detect and record the events. The information can be further processed or analyzed to a user or a program at a later time when monitoring process is completed. It will be appreciated that the monitoring process can be arranged and configured to include an on-site feedback to a user or the program monitored.

The thread switch controller 402 includes a plurality of thread switch control registers, one of which is a thread switch control register HID0 404. The register HID0 404 is an architected software-accessible special purpose register. The register HID0 contains the features which provide the ability to switch threads on events important to the program profiler, other information related to threadswitch, and the ability to force a switch from the monitoring thread back to the processing thread being monitored. As a result, the thread control register allows software to selectively control individual events it desires to track via thread switching techniques. The events of interest can be a thread switch reason such as the data cache miss, instruction cache miss, etc. A detailed list of the thread switch reasons is provided later. Information related to the events of interest that can also be accessed includes the next instruction address (NIA) and the machine state registers (MSR) of a dormant thread, the effective address (EA) of a data cache miss, etc. In one embodiment, the register HID0 404 has bits readable by the monitor program. One set of bits represent a list of thread switch reasons. In one embodiment, the list of the thread switch reasons represented by 64 bits is as follows:

| BIT | LIST OF THREAD SWITCH REASONS |
|---|---|
| (0) | Switch on L1 data cache fetch miss |
| (1) | Switch on L1 data cache store miss |
| (2) | Switch on L1 instruction cache miss |
| (3) | Switch on instruction translation lookaside buffer (TLB) miss |
| (4) | Switch on L2 cache fetch miss |
| (5) | Switch on L2 cache store miss |
| (6) | Switch on L2 instruction cache miss |
| (7) | Switch on data translation lookaside buffer (TLB)/segment lookaside buffer miss |
| (8) | Switch on L2 cache miss and dormant thread not L2 cache miss |
| (9) | Switch when thread switch time-out value reached |
| (10) | Switch when L2 cache data returned |
| (11) | Switch on IO external accesses |
| (12) | Switch on double-X store: miss on first of two* |
| (13) | Switch on double-X store: miss on second of two* |
| (14) | Switch on store multiple/string: miss on any access |
| (15) | Switch on load multiple/string: miss on any access |
| (16) | Reserved |
| (17) | Switch on double-X load: miss on first of two* |
| (18) | Switch on double-X load: miss on second of two* |
| (19) | Switch on or 1,1,1 instruction if machine state register (problem state) bit, msr(pr)=1. Allows software priority change independent of msr(pr). If bit 19 is one, or 1,1,1 instruction sets low priority. If bit 19 is zero, priority is set to low only if msr(pr)=0 when the or 1,1,1, instruction is executed. |
| (20) | Reserved |
| (21) | Thread switch priority enable |
| (22–29) | Reserved |
| (30–31) | Forward progress count |
| (32–63) | Reserved in 64 bit register implementation. |

*A double-X load/store refers to loading or storing an elementary halfword, a word, or a double word, that crosses a doubleword boundary. A double-X load/store in this context is not a load or store of multiple words or a string of words.

It will be appreciated that the register HID0 404 may have additional bits or less bits depending on various events in different monitoring programs.

In addition, the register HID0 404 of one preferred embodiment of the present invention includes a bit which forces a thread switch (called force-thread-switch bit). The force-thread-switch bit can be set by software method, e.g. via the software monitor program. For example, when the bit is updated (from 0 to 1, 1 to 1, 1 to 0, or 0 to 0) depending on the hardware implementation, a thread switch is forced from the active thread to a dormant thread. The register HID0 404 includes another bit which indicates whether a thread switch has occurred (called thread-switch-occurred bit). The thread-switch-occurred bit can be set by hardware when a thread switch has occurred and can be reset or modified by software monitor program before the monitoring thread relinquishes control to the processing thread. The register HID0 404 further includes a bit which allows exactly two thread switches to occur. This thread-switch-twice bit can be set by software monitor program. The thread-switch-twice bit indicates that the controller 402 only allows two thread switches at which time it sets a block-thread-switch bit of the register HID0 404 which blocks thread switching. The block-thread-switch bit is set by hardware such that no thread switching can be made during the recording of the selected event. Once the recording of the selected event is complete, the block-thread-switch bit is reset by software so that a subsequent selected event can be detected. This ensures that once the monitor gains control, i.e. the monitoring thread becomes active, it can execute without interruption by other potential threadswitches until the monitor relinquishes control after completion of the recording of the event.

The use of the above mentioned bits is one example of a monitoring method. It will be appreciated that different monitoring methods can be implemented without departing from the scope or spirit of the present invention. Additional or less bits or additional registers can be configured and arranged in various different monitoring methods.

Figure 3:
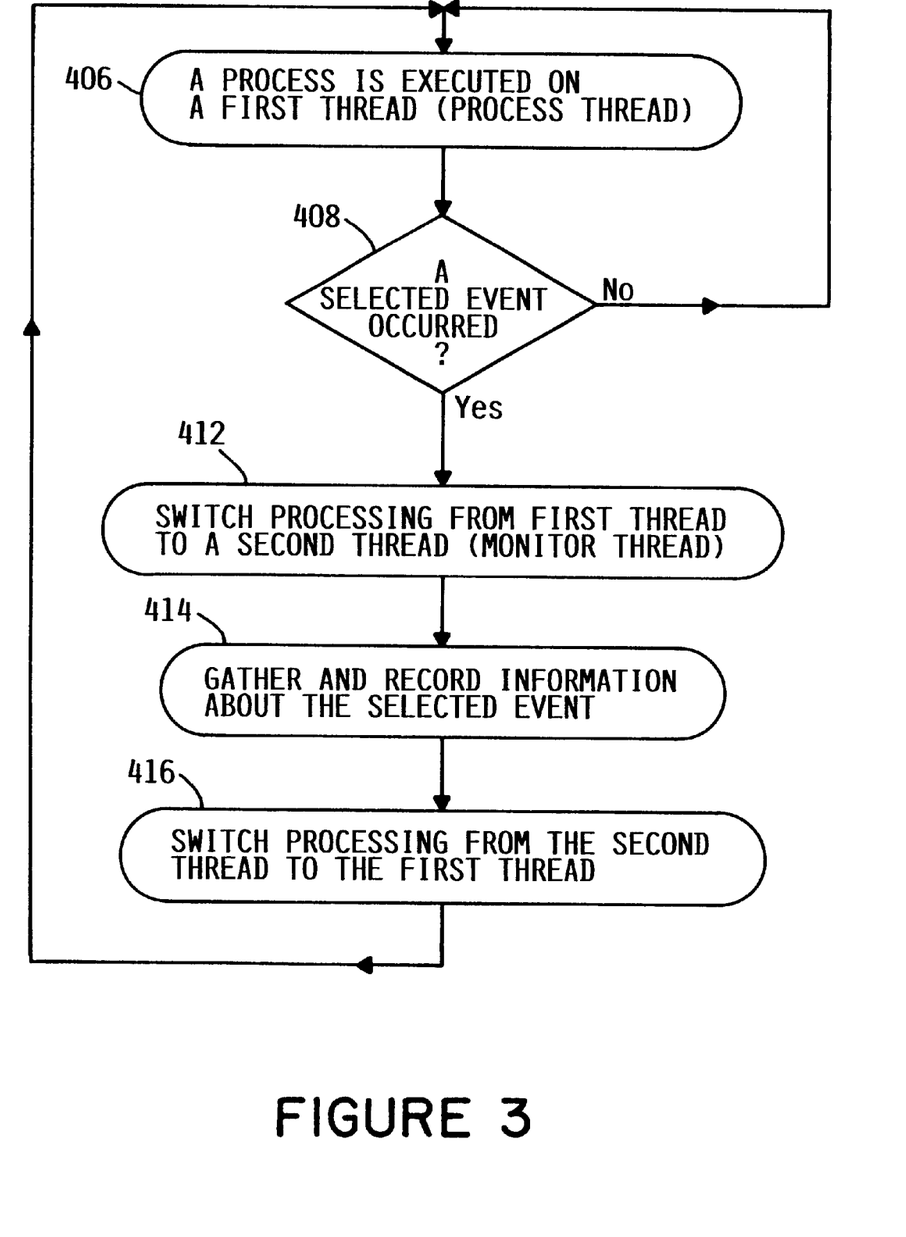
FIG. 3 is a flowchart illustrating an operation of a dual-threaded processor the multithreaded data processing system consistent with the present invention.

FIG. 3 is a flowchart illustrating an operation of a dual-threaded processor of the multithreaded data processing system 10. The dual-threaded processor is the simplest case for the multithreaded processor 100, one embodiment of which includes the features discussed above as shown in FIG. 2. The dual-threaded processor executes a program to be monitored on a first thread (the processing thread) in box 406. The controller 402 checks to determine whether a selected event has occurred in box 408. If a selected event has not occurred, the dual-threaded processor continues executing the program on the first thread in box 406. Once a selected event occurs, the thread switch controller 402 of the dual-threaded processor switches processing from the first thread to a second thread (the monitoring thread) in box 412. Then the monitor software gathers information from the register HID0 in box 414 regarding the selected event, such as the thread switch reason (as listed above), the cycle counts which indicate the time spent on the processing thread, or a dormant thread facility (e.g. the next instruction address (NIA), the machine state register (MSR), or the effective address (EA) of the data cache miss), etc. In box 416, the thread switch controller 402 switches processing back from the second thread (monitoring thread) to the first thread (processing thread). Thereafter, the dual-threaded processor continues executing the process of the monitored program on the first thread until the next selected event occurs.

Figure 4:
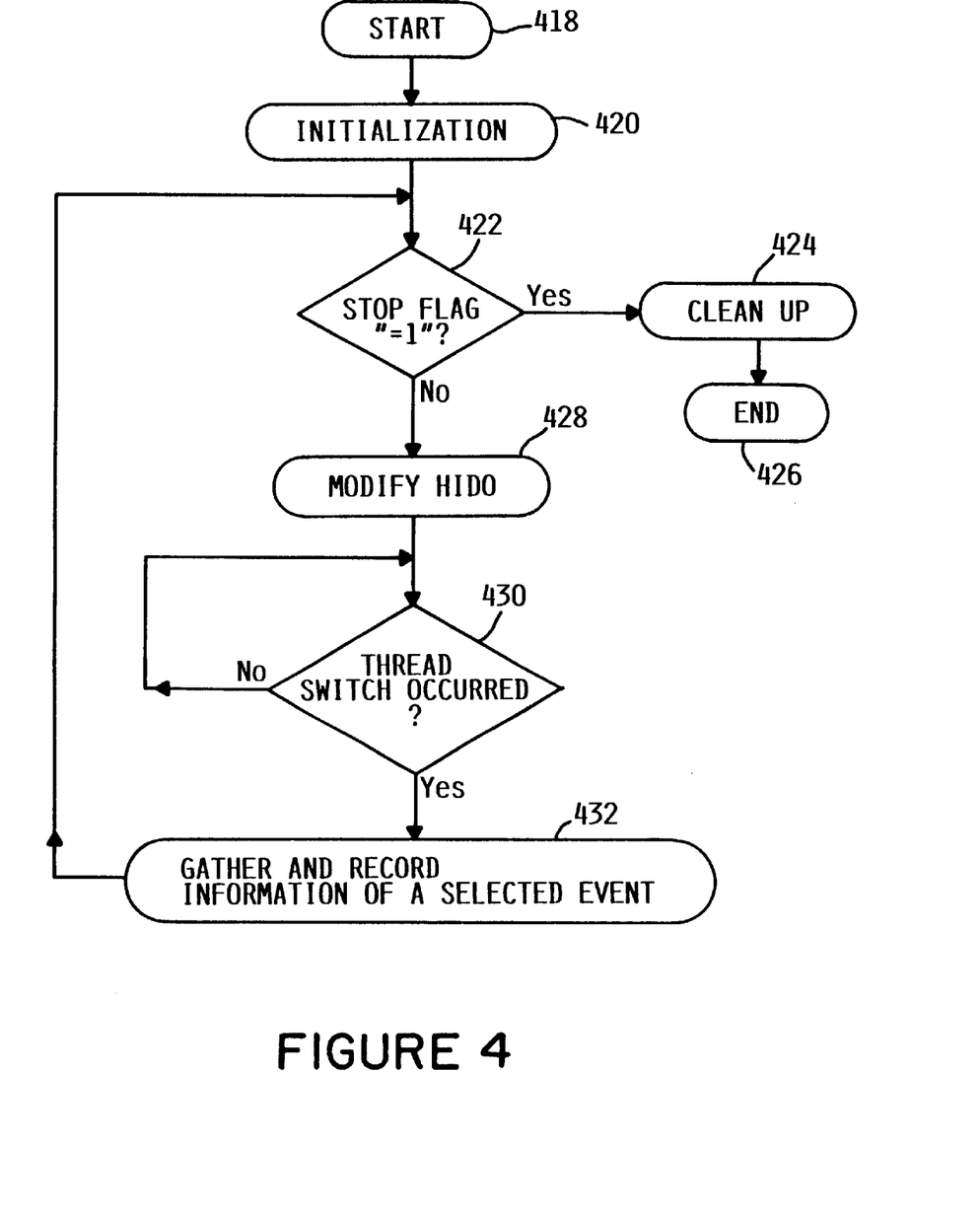
FIG. 4 is a flowchart illustrating an operation of a monitoring thread with respect to the dual-threaded processor consistent with the present invention.

FIG. 4 is a flowchart illustrating an operation of a monitoring thread with respect to the dual-threaded processor consistent with the present invention. The processor starts with box 418 and initializes software variables and hardware registers, etc., in box 420, including the variables and registers in the thread switch controller 402, one of which is the thread switch control register HID0 404. For example, in one embodiment, the bit which allows exactly two thread switches to occur (i.e. thread-switch-twice bit) of the register HID0 404 is set to "1". It will be appreciated that one skilled in the art may set or initialize variables, such as the thread-switch-twice bit, differently without departure from the principles of the present invention.

Still in FIG. 4, if the monitor software determines to terminate or suspend the monitoring process in box 422, i.e. the stop monitoring flag="1", the thread designated for the monitoring process (the monitoring thread) will be released and/or used for other processes by the multithreaded processor via a clean up process in box 424, and the monitoring process is ended in box 426. The data processing system 10 is then restored to a normal mode, i.e., a running or executing mode without monitoring. If the monitor software determines that it should continue monitoring, the monitor software modifies the register HID0 404. The bit which forces a thread switch (i.e. force-thread-switch bit) is set to "1", the bit which indicates whether a thread switch has occurred (i.e. thread-switch-occurred bit) is set to "0", and the bit which blocks thread switching (i.e. block-thread-switch bit) is set to "0". At this point of time, the monitor program is ready to become dormant, and the hardware performs a thread switch.

In box 430, the monitor program loops while checking for the thread-switch-occurred bit to be "1". The purpose of this loop is to prevent the monitor program from re-recording information before the processing thread regains control. Depending on the design of the processor, this loop may not be required. For example, if hardware guarantees a thread switch within a certain number of cycles after the monitor software program sets the force-thread-switch bit, a string of no-operation instructions could be used to prevent re-recording information. Then the monitor program becomes dormant while hardware switches to a processing thread.

Once a selected event is detected, the monitoring thread becomes active, at which time information about the selected event is gathered in box 432. The information includes the last thread switch reason, the cycle counts, and the dormant thread facilities such as the next instruction address (NIA), the machine state register (MSR), and the effective address (EA) for the data cache miss, etc., can be gathered from the architected software-accessible special purpose registers, such as the register HID0 404. After completion of the information gathering in box 432, the controller 402 switches the process from the monitoring thread to the processing thread in box 406 as shown in FIG. 3.

Figure 5A:
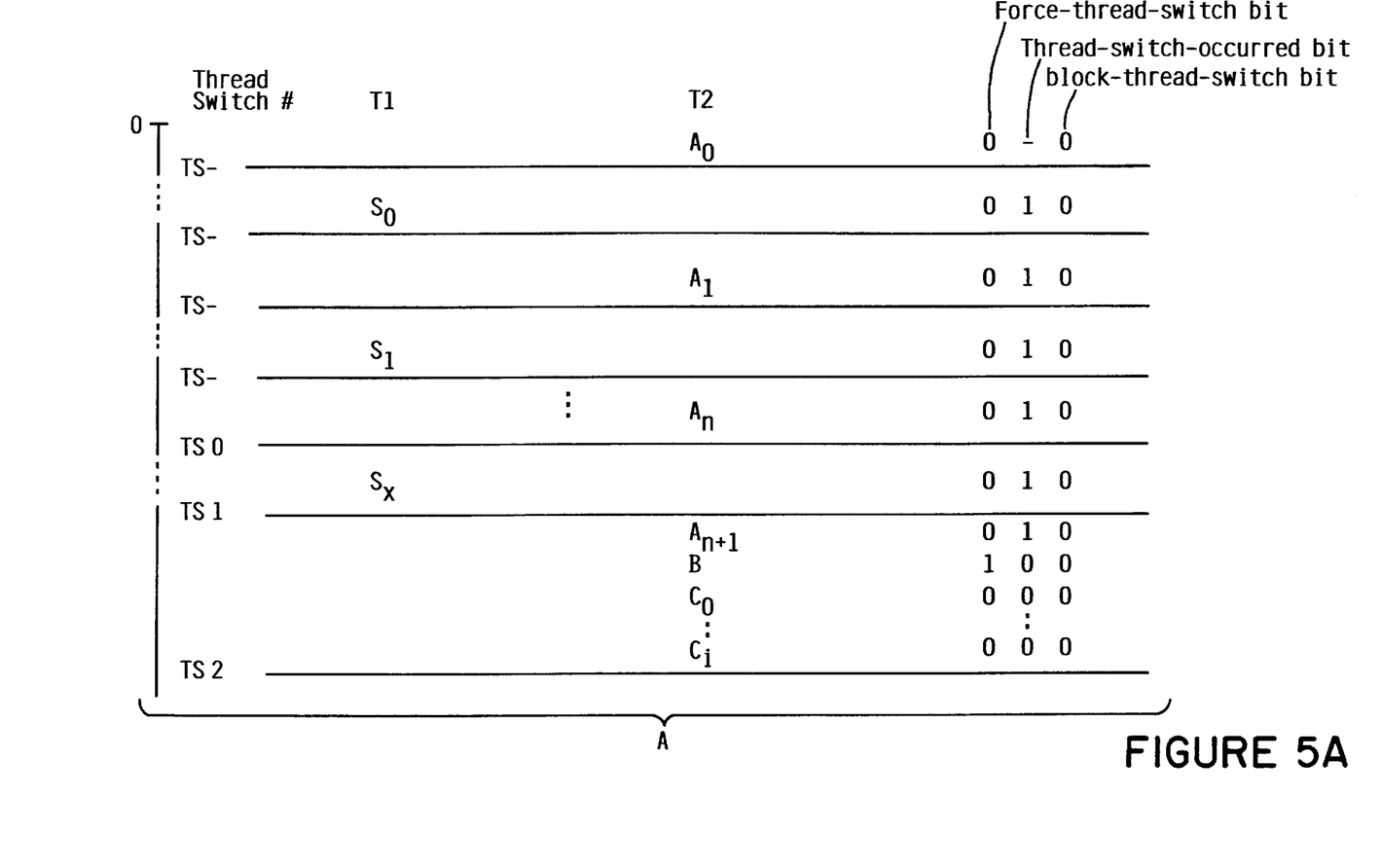
FIG. 5 is a timeline illustration of an operation of the dual-threaded processor consistent with the present invention.
Figure 5B:
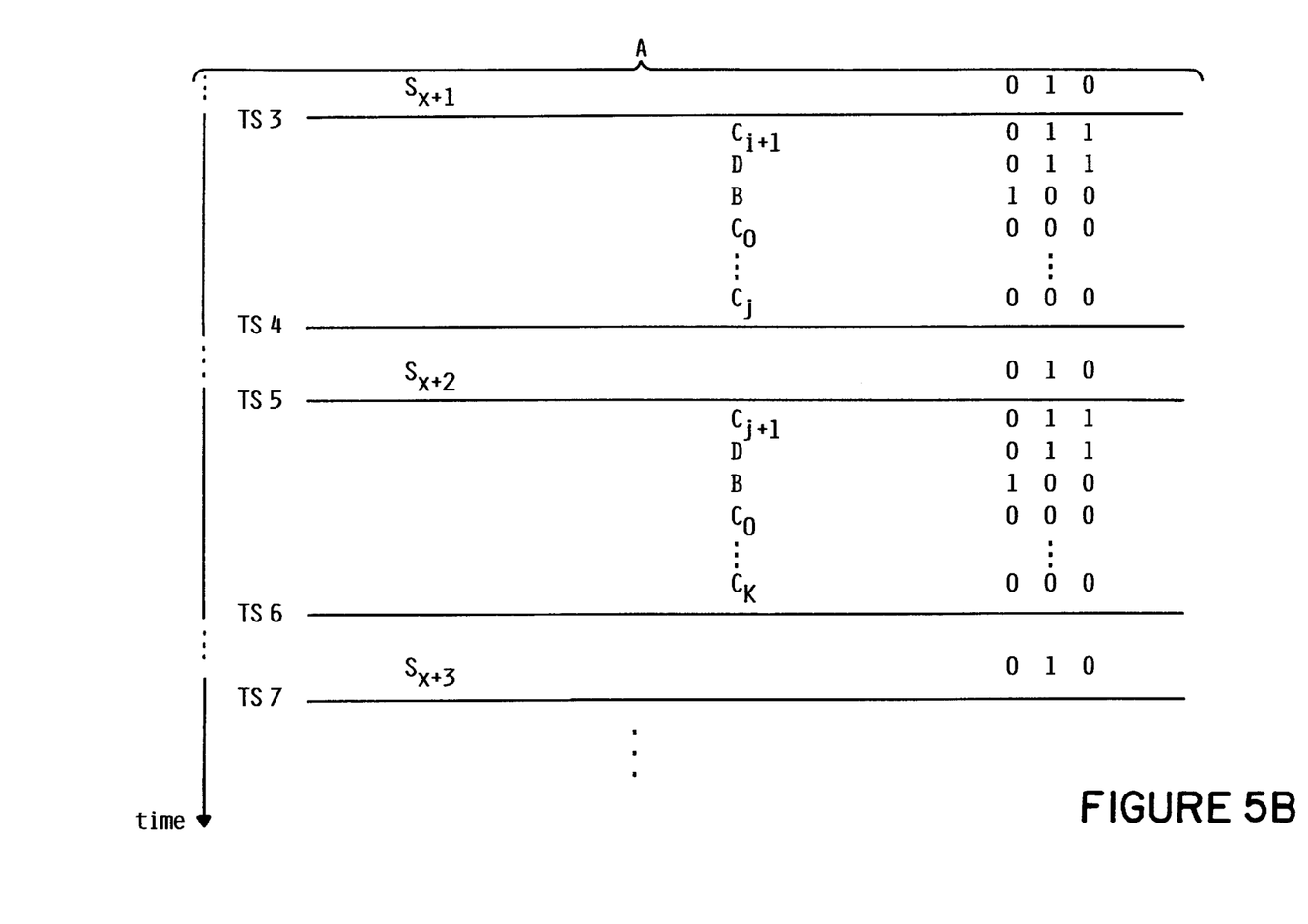

FIG. 5 is a timeline illustration of an operation of the dual-threaded processor consistent with the present invention. The left vertical line represents a timeline starting from the top. To shorten the timeline illustration of executing a program on the first thread, some portions of the timeline are shown in broken dots. T1 stands for an application processing thread and T2 for a monitoring thread. Horizontal lines stand for occurrence of the thread switches after detecting a selected event. "$A_0, A_1 \ldots A_n, A_{n+1}$" are a sequence of stages to execute initialization processes of the monitor program on the second thread T2 including variables of the controller 402 and registers such as the register HID0 404. Until the monitor program is fully initialized, i.e., all the variables and registers are reset, the hardware treats the monitor program as any other programs for thread switch purposes. Accordingly, the initialization may be broken into several stages $A_0$ to $A_{n+1}$ as shown between which slices "$S_0, S_1 \ldots S_x$" of a program are executed on the first thread T1. $A_{n+1}$ represents that the initialization of the monitor is complete. Between A and S, a thread switch is made by the controller 402. It will be appreciated to a person skilled in the art that the initialization can be completed in a single stage. It will also be appreciated that to synchronize the data collection, a master task dispatcher could start the program to be monitored after the monitor has initialized.

Still in FIG. 5, TS# is the thread switch number along the timeline. The thread switches before TS0, i.e. TS-, can be ignored by the processes. It will be appreciated that the TS- can be blocked by the controller 402 if the initialization is completed in one stage. "–" can be used to indicate "don't-care" type of states. "B" stands for the state where the register HID0 is modified. "C" stands for the state where the monitor loops around as shown in box 430 waiting for occurrence of a selected event. The monitor can loop around a number of cycles, $C_0$ to $C_i$ or $C_j$ or $C_k$ depending on the design of the processor. "D" stands for a state of gathering information of the selected event.

The three bits on the right side of FIG. 5 represent the force-thread-switch bit, the thread-switch-occurred bit, and the block-thread-switch bit. During initialization, the system is running in a non-monitoring mode, the force-thread-switch bit is "0", the thread-switch-occurred bit is "1", and the block-thread-switch bit is "0". The initialization is completed at state $A_{n+1}$, whereby the register HID0 is modified such that the force-thread-switch bit is "1", and the monitor loops around and waits for the thread-switch-occurred bit to be set to "1" by hardware. So at TS2, the loop is interrupted by a thread switch caused by the force-thread-switch bit set to "1", and the processing thread continues executing the application or a system program. Once a selected event is detected, the controller 402 switches (TS3) from processing $S_{x+1}$ on the first thread to processing the monitor on the second thread, whereby the block-thread-switch bit of the register HID0 is changed to "1" so that no threadswitch is allowed until it is reset to "0". Information related to the selected event is gathered at D. Upon completion of the information gathering, the register HID0 is modified at B. The block-thread-switch bit indicates the allowance of a threadswitch, and the force-thread-switch bit is set to "1". As a result, the controller 402 switches (TS4) from processing the monitor on the second thread back to processing the application slice $S_{x+2}$ on the first thread. This routine repeats when TS5 occurs as shown in FIG. 5. It will be appreciated that other types of presentations or illustrations for alternating application/monitoring thread switches and processing can be used without departing from the principles of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A multithreaded processor, arranged and configured to process a plurality of threads and facilitate thread switch, for monitoring performance of the application executed by the processor, comprising:

(a) a first thread arranged and configured for executing the application on the first thread;

(b) a second thread arranged and configured for executing recording of at least one selectable thread switch event upon detection of the selectable thread switch event during execution of the application on the first thread; and (c) a thread switch controller for detecting the selectable thread switch event and controlling thread switch between the first thread and the second thread, wherein in response to detection of the selectable thread switch event, the thread switch controller switches processing from the first thread to the second thread, whereby the second thread records information of the selectable thread switch event, and upon completion of recording, the thread switch controller switches processing from the second thread to a thread other than the second thread to continue execution of the application.

2. A multithreaded processor of claim 1, wherein the thread switch controller comprises a thread switch control register including a first bit for forcing a thread switch, a second bit for indicating whether the thread switch has occurred, a third bit for blocking a thread switch, a fourth bit for allowing exactly two thread switches to occur, and a set of bits for encoding a latest thread switch reason.

3. A multithreaded processor of claim 1, wherein the first thread is normally an active thread, the second thread is normally a dormant thread.

4. A multithreaded processor of claim 2, wherein the thread switch control register is an architected software-accessible special purpose register in which the second bit, the third bit, and the set of bits are set by hardware operatively connecting to the processor.

5. A multithreaded processor of claim 1, wherein the selectable thread switch event includes at least one from the group consisting of: L1 data cache miss, L2 data cache miss, L1 instruction cache miss, L2 instruction cache miss, instruction translation lookaside buffer (TLB) miss, data translation lookaside buffer (TLB) miss, and thread time-out.

6. A method of monitoring at least one selectable event of at least one application by a multithreaded processor which is arranged and configured to process a plurality of threads and facilitate thread switch, the method comprising the steps of:
   (a) executing the application on a first thread of the multithreaded processor;
   (b) detecting the selectable event of the application by a thread switch controller;
   (c) switching processing from the first thread to a second thread responsive to detecting the selectable event;
   (d) executing the second thread to record information of the selectable event; and
   (e) switching processing from the second thread to a thread other than the second thread, upon completion of recording.

7. The method of claim 6, the thread switch controller providing a thread switch control register including a first bit for forcing a thread switch, a second bit for indicating whether the thread switch has occurred, a third bit for blocking thread switch, a fourth bit for allowing exactly two thread switches to occur, and a set of bits for encoding a latest thread switch reason.

8. The method of claim 6, the first thread being normally an active thread, the second thread being normally a dormant thread.

9. The method of claim 7, the thread switch control register being an architected software-accessible special purpose register in which the second bit, the third bit, and the set of bits are set by hardware operatively connecting to the processor.

10. The method of claim 6, wherein the selectable event includes at least one from the group consisting of: L1 data cache miss, L2 data cache miss, L1 instruction cache miss, L2 instruction cache miss, instruction translation lookaside buffer (TLB) miss, data translation lookaside buffer (TLB) miss, and thread time-out.

11. An article of manufacture for a computer-based user-interface, the article of manufacture comprising a computer readable medium having instructions for causing a computer to perform a method, by a multithreaded processor arranged and configured to process a plurality of threads and facilitate thread switch, the method comprising the steps of:
   (a) executing the application on a first thread of the multithreaded processor;
   (b) detecting at least one selectable event of the application by a thread switch controller of the multithreaded processor;
   (c) switching processing from the first thread to a second thread responsive to detecting the selectable event;
   (d) executing the second thread to record information of the selectable event; and
   (e) switching processing from the second thread to a thread other than the second thread, upon completion of recording.

12. A computer system, comprising:
   a multithreaded processor, said multithreaded processor supporting the concurrent execution of a plurality of threads and including:
     (a) a plurality of sets of registers, each set corresponding to a respective thread, and
     (b) thread switch logic, said thread switch logic switching execution from one of said plurality of threads to another of said plurality of threads in response to detection of a thread switch condition; and
   a performance monitor embodied as a plurality of processor-executable instructions in a monitoring thread stored on said computer system, wherein said monitoring thread records the occurrence of a thread switch event responsive to said thread switch logic switching execution from a monitored thread to said monitoring thread, and wherein said monitoring thread causes said thread switch logic to switch execution to a thread other than said monitoring thread after recording the occurrence of said thread switch event.

13. A computer system of claim 12, wherein the thread switch logic comprises a software-accessible thread switch control register having a plurality of thread switch control bits, wherein at least one of said control bits is set by hardware operatively connected to the processor.

14. A computer system of claim 13, wherein said thread switch control bits include a bit for forcing a thread switch.

15. A computer system of claim 13, wherein said thread switch control bits include a plurality of bits specifying a reason for a thread switch.

* * * * *